(12) United States Patent
Verity

(10) Patent No.: US 6,671,743 B1
(45) Date of Patent: Dec. 30, 2003

(54) METHOD AND SYSTEM FOR EXPOSING PROPRIETARY APIS IN A PRIVILEGED DEVICE DRIVER TO AN APPLICATION

(75) Inventor: Steve Verity, Santa Clara, CA (US)

(73) Assignee: Creative Technology, Ltd., Creative Resource (SG)

( * ) Notice: Subject to any disclaimer, the term of this patent is extended or adjusted under 35 U.S.C. 154(b) by 0 days.

(21) Appl. No.: 09/191,312

(22) Filed: Nov. 13, 1998

(51) Int. Cl.$^7$ .............................................. G06F 13/10
(52) U.S. Cl. ...................................... 709/321; 709/324
(58) Field of Search ................................ 709/321, 322, 709/323, 324, 326, 327, 328

(56) References Cited

U.S. PATENT DOCUMENTS

| | | | | | |
|---|---|---|---|---|---|
| 5,475,845 A | * | 12/1995 | Orton et al. | ................ | 395/700 |
| 5,887,169 A | * | 3/1999 | Lacombe | .................... | 395/681 |
| 6,044,415 A | * | 3/2000 | Futral et al. | .................. | 710/33 |
| 6,154,208 A | * | 11/2000 | Otala | ......................... | 345/335 |
| 6,247,067 B1 | * | 6/2001 | Berliner et al. | ............. | 709/321 |
| 6,393,493 B1 | * | 5/2002 | Madden et al. | ............. | 709/321 |
| 6,393,496 B1 | * | 5/2002 | Schwaderer et al. | ........ | 709/328 |

* cited by examiner

*Primary Examiner*—John Follansbee
*Assistant Examiner*—The Thanh Ho
(74) *Attorney, Agent, or Firm*—Blakely, Sokoloff, Taylor & Zafman LLP

(57) ABSTRACT

According to an embodiment of the present invention, a method for interfacing of application programs with operating system device drivers is provided. The method includes a variety of steps such as assigning an arbitrary message number to each of a plurality of functions from a device driver. Wrapper programs for the application and the device driver are provided. The method then includes a step of providing a 'surrogate' function for the application to call. Parameters passed into the function are extracted by the wrapper program for the application. The parameters are next stored into a data packet along with a corresponding message number. Next, the data packet is sent to the wrapper program for the device driver. In a subsequent step, the device driver wrapper program determines which function the application is invoking by the message, unpacks the parameters from the data packet and calls the corresponding function in the device driver. In many embodiments, data returned from the function is passed back through an analogous mechanism. The combination of these steps can provide an interface between the application and the device driver.

12 Claims, 3 Drawing Sheets

METHOD AND SYSTEM FOR EXPOSING PROPRIETARY APIS IN A PRIVILEGED DEVICE DRIVER TO AN APPLICATION

BACKGROUND OF THE INVENTION

The present invention relates to interfacing of application programs with operating system device driver components and more particularly to method and system for exposing API functions of device drivers to application programs.

Device drivers provide access to third parities desiring to extend operating system capabilities. These device drivers enable the operating system to be used with a wide variety of hardware, because the user can install a set of device drivers that reflects the installed hardware of her particular system. Typically, device drivers run in privileged state because they must access hardware directly. Applications are typically blocked from directly calling the device drivers because application programs do not run in privilege state. Further, applications typically do not execute in the same address context as the device drivers.

Systems known in the art provide methods for applications to access device driver capabilities. One method for accessing device driver functions is to provide a general purpose access mechanism through an application programming interface (API). The API comprises a set of callable functions which enables a user application to communicate with a device driver by sending messages. These messages contain specific data for the device driver. The API mechanism also allows applications to receive data from the device driver. Many applications communicate with device drivers by some form of this Message based API.

However, these methods add an extra layer of complexity because they are intended to be general purpose. Greater speed and interoperabilities could be realized in cases where it would be desirable to invoke the driver directly.

SUMMARY OF THE INVENTION

The present invention provides techniques for improved interfacing of application programs with operating system device drivers. More particularly, the present invention provides a surrogate function for applications to invoke device driver capabilities.

According to an embodiment of the present invention, a method for interfacing of application programs with operating system device drivers is provided. The method includes a variety of steps such as assigning an arbitrary message number to each of a plurality of functions from a device driver. Steps of providing a wrapper program for the application and a wrapper program for the device driver are also part of the method. The method then includes a step of providing a 'surrogate' function for the application to call. A step of extracting all parameters passed into the function is performed when an application program invokes the surrogate function is performed by the wrapper program for the application. A step of storing the parameters into a data packet along with a corresponding message number can also be part of the method. Next, a method step of sending the data packet to the wrapper program for the device driver is performed. In a subsequent step, the device driver wrapper program determines which function the application is invoking by the message number. A step of unpacking the parameters from the data packet is part of the method. The method then calls the corresponding function in the device driver. In many embodiments, data returned from the function is passed back through an analogous mechanism. The combination of these steps can provide an interface between the application and the device driver.

In another aspect of the present invention, a computer program product for interfacing an application program to a device driver can comprise code for performing a variety of steps, including code for assigning an unique identifier to each of a plurality of functions performable by the device driver. Code for providing a wrapper program for the application, that has at least one surrogate function for the application to invoke. The surrogate function corresponds to one of the plurality of functions performable by the device driver can also be part of the product. The product can also include code for providing a wrapper program for the device driver and code for extracting at least one parameter passed from the application responsive to an invocation of one of the plurality of functions of the device driver by the application program through the surrogate function. Further, code for storing the at least one parameter in a data packet along with a unique corresponding message number and code for sending the data packet to the wrapper program for the device driver are included. Embodiments can also include code for determining in the wrapper program for the device driver a selected function being invoked by the application program using the unique corresponding message number, as well as code for retrieving the at least one parameter from the data packet. Additionally, code for invoking the one of the plurality of functions of the device driver corresponding to the message number is also part of the product. Finally, a computer readable storage medium is included for holding the code.

Numerous benefits are achieved by way of the present invention over conventional techniques. In some embodiments, the present invention is more computationally efficient than conventional techniques. The present invention can provide a way for the user to access device driver functions without resorting to computationally expensive API access techniques. Some embodiments according to the invention are more robust than known techniques. These and other benefits are described throughout the present specification and more particularly below.

A further understanding of the nature and advantages of the inventions herein may be realized by reference to the remaining portions of the specification and the attached drawings.

DESCRIPTION OF THE SPECIFIC EMBODIMENTS

Hardware for Implementing the Present Invention

Figure 1:
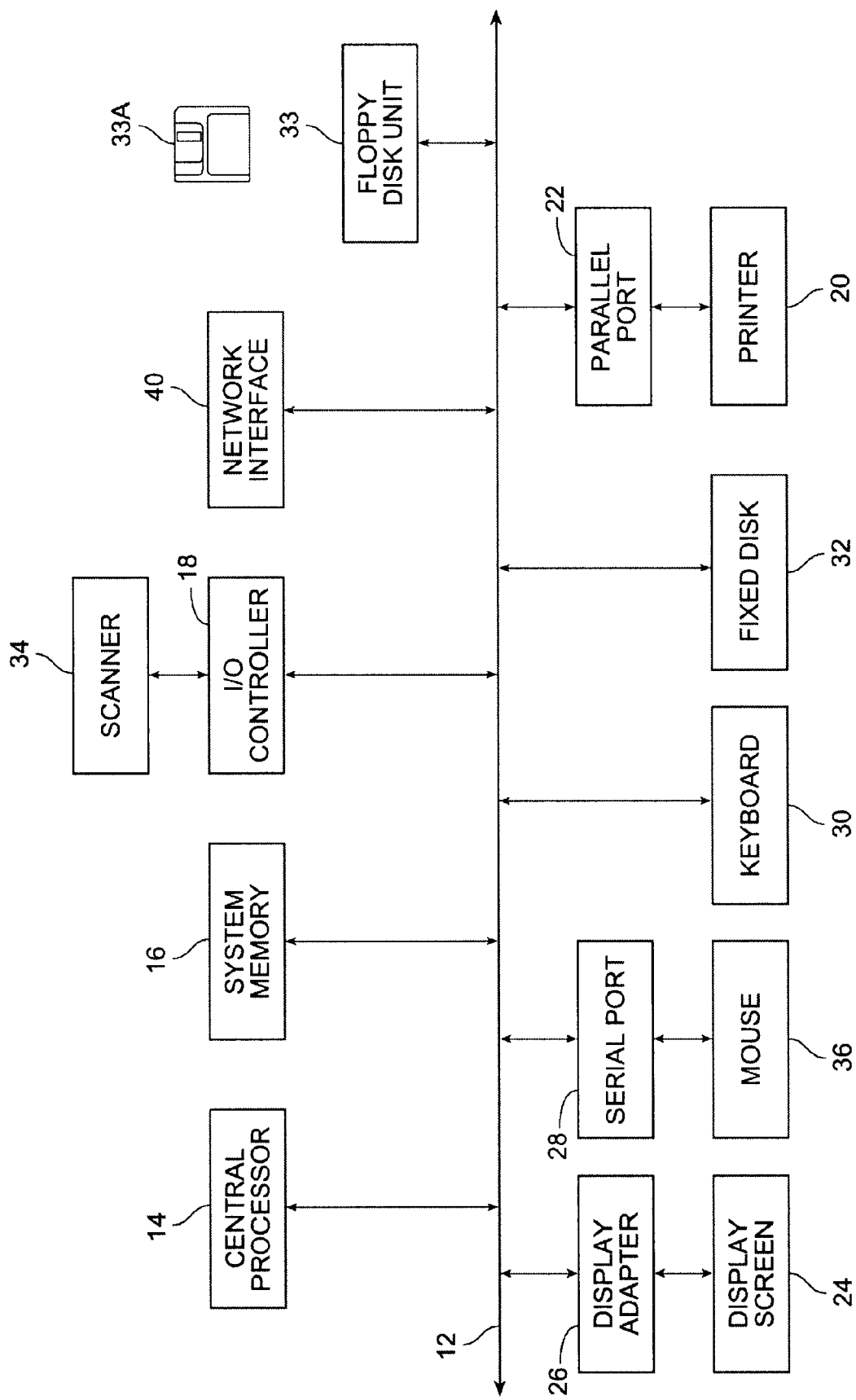
FIG. 1 depicts a representative computer system suitable for implementing the present invention.

The method for interfacing application programs with operating system device drivers of the present invention is implemented in the C programming language and is operational on a computer system 10 as shown in FIG. 1. Computer 10 may be a terminal, a personal computer, a high-end workstation or even a mainframe. In a present preferable embodiment, computer system 10 is a personal computer. The invention may be implemented in a client-server environment, but a client-server environment is not essential. In embodiments implemented in a client-server environment, a server computer receives queries from (typically remote) client computers, does substantially all the processing necessary to formulate responses to the queries, and provides these responses to the clients. However, the server may itself act in the capacity of a client when it accesses remote databases located at another node acting as a database server.

The hardware configurations are in general standard and will be described only briefly. In accordance with known practice, computer 10 includes one or more processors 14 which communicate with a number of devices and peripheral devices via a bus subsystem 12. These devices typically include a memory subsystem, a persistent storage subsystem for holding computer programs (e.g., code or instructions) and data, a plurality of user interface input and output devices and an interface to other equipment using networks with protocols such as Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in other computers via a network connection 45.

The user interface input devices typically include a keyboard 30 and may further include a pointing device such as a mouse 36 accessible via a serial port 28 and a scanner 34 connected to bus 12 via an input/output controller 18. The pointing device may be an indirect pointing device such as a, trackball, touch pad, or graphics tablet, or a direct pointing device such as a touch screen incorporated into a display 24. Other types of user interface input devices, such as voice recognition systems, are also possible.

The user interface output devices typically include a printer 20 connected to bus 12 via a parallel port 22 and a display screen 24 accessible via a display adapter 26. The display device may be a cathode ray tube (CRT), a flat-panel device such as a liquid crystal display (LCD), or a projection device. Display adapter 26 provides control signals to the display device and normally includes a display memory for storing the pixels that appear on the display device. The display subsystem may also provide non-visual display such as audio output.

The memory subsystem typically includes a number of memories including a main random access memory (RAM) 16 for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The persistent storage subsystem provides non-volatile storage for program and data files and typically includes at least one fixed disk drive 32 and at least one floppy disk drive 33 (with associated removable media 33a). There may also be other devices such as a CD-ROM drive and optical drives (all with their associate removable media). Additionally, the computer system may include drives of the type with removable media cartridges. The removable media cartridges may, for example be hard disk cartridges, such as those marketed by SYQUEST and others, and flexible disk cartridges, such as those marketed by IOMEGA. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of personal computers and workstations.

Bus subsystem 12 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as network adapter on one of these expansion buses or a modem on a serial port. The client computer may be a desktop system or a portable system.

Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as a fixed disk 32 or a floppy disk 33A. In a present preferable embodiment, the method of interfacing applications with device drivers executes under the MICROSOFT WINDOWS95 and WINDOWS98 operating systems.

Functional Overview

Figure 2:
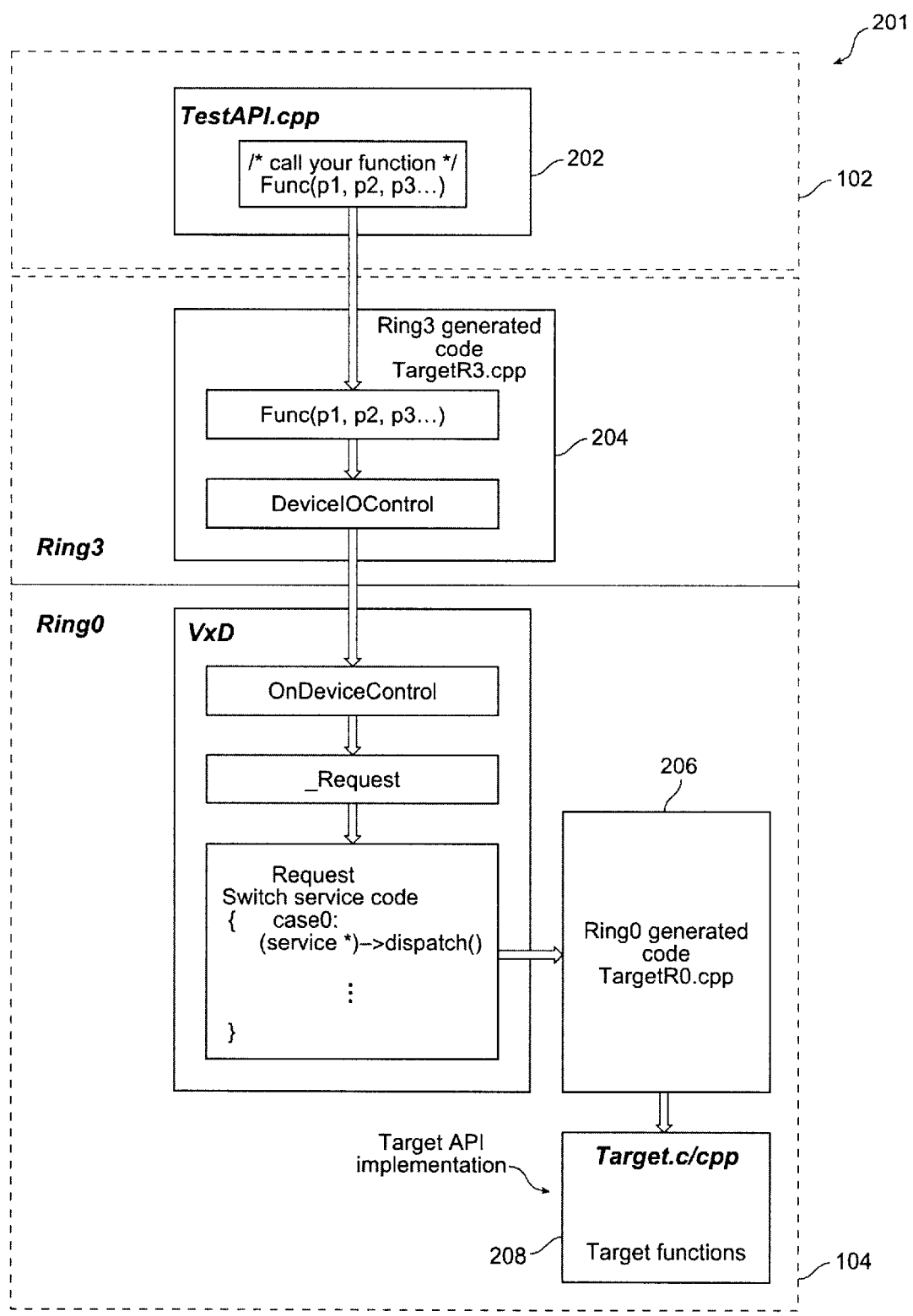
FIG. 2 depicts a simplified process block diagrams for representative interfacing processes according to a specific embodiment of the invention.

FIG. 2 depicts a simplified process block diagram 201 of the processes in a particular embodiment according to the invention for interfacing application programs with operating system device drivers operatively disposed in system memory 16 and executed by processor 14 of FIG. 1. Application program 202 resides in address space 102 and executes in program (non-privileged) state. Wrapper program for the application 204 provides a set of unique function identifiers which correspond to the functions executed by device driver 208 residing in address space 104 and executing in privileged state. Parameters passed by the application to the function are extracted by the wrapper for the application and stored into one or more data packets for transmission to the wrapper for the device driver 206. The wrapper for the device driver 206 retrieves the parameters and routes them to the appropriate function in the device driver 208 based upon the unique function identifier.

Detailed Description of Processing

Figure 3:
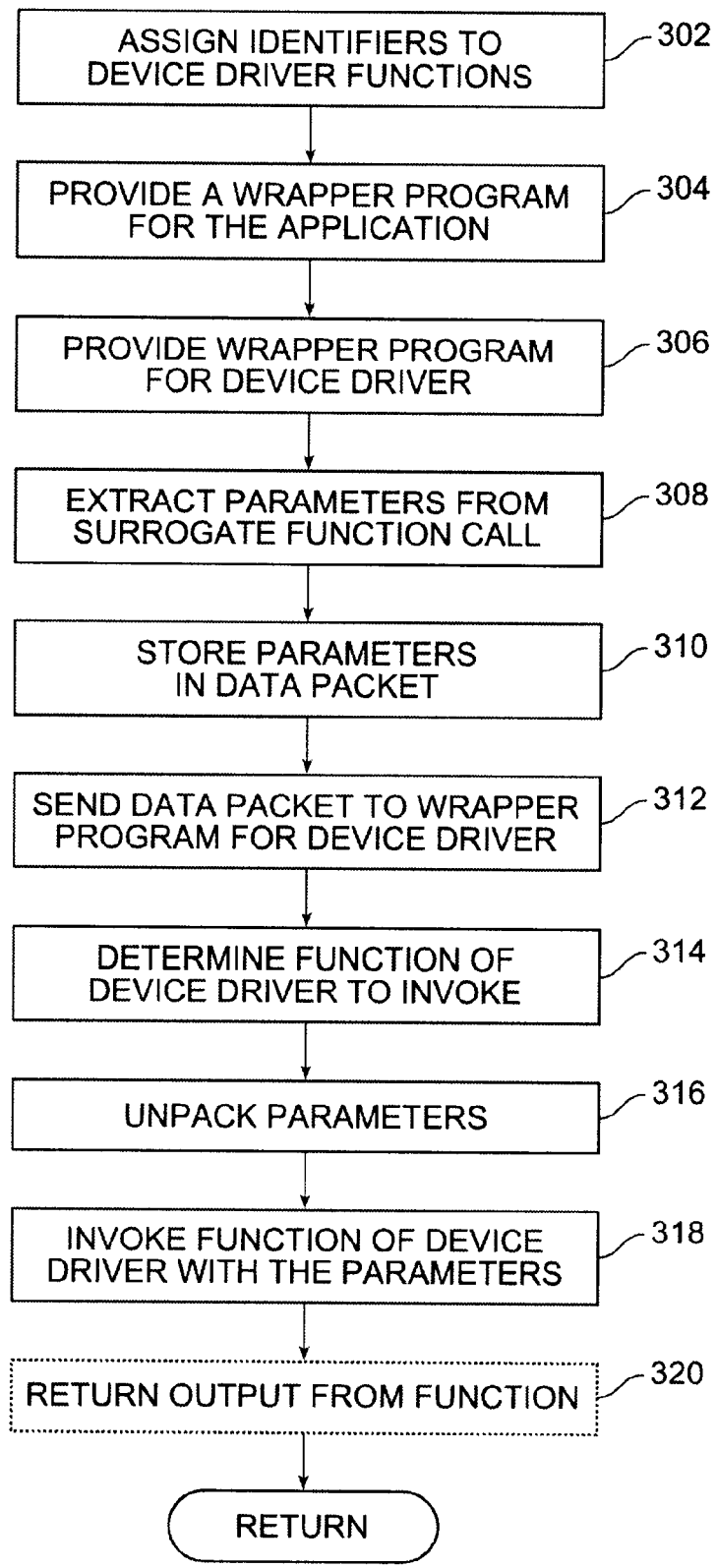
FIG. 3 depicts a simplified flowchart of representative process steps according to a specific embodiment of the invention.

FIG. 3 depicts a representative flowchart 301 of simplified process steps in a particular embodiment of the computer-implemented method for exposing device driver functions to applications. In a step 302, a unique message identifier is assigned to each of a plurality of functions from the device driver. In a step 304, a wrapper program for the application is provided. In a presently preferable embodiment, this wrapper is embodied in a Dynamically Linked Library (DLL). This wrapper forms a 'surrogate' function for the application to invoke. The surrogate function appears to the application exactly as the real function in the driver. In a step 306, a wrapper program for the device driver is provided. Next, in a step 308, parameters passed into the function are extracted when the application program invokes the surrogate function. In a step 310, the parameters are stored into a data packet along with a corresponding message number.

Then, in a step 312, the data packet is sent to the wrapper program for the device driver. A step 314 of determining which function the application is seeking to invoke by the message number is performed by the wrapper program for the device driver. Next, in a step 316, the parameters from the data packet are unpacked. Then, in a step 318, the corresponding function in the device driver is invoked. In many embodiments, data returned from the function is passed back through an analogous mechanism.

The present invention has been described in terms of specific embodiments comprised of a combination of hardware and software. Other embodiments may be created by more closely combining the various functions which make up the invention. For example, processing contained in the wrapper program for the application and the wrapper program for the device driver may be combined into a single form factor using methods such as incorporating both processes into a single software process or on a single silicon chip. Alternatively, embodiments may be created by more distantly separating the various functions which make up the invention. Other and different processes or hardware may be substituted for those of the specific embodiments enumerated here.

CONCLUSION

In conclusion the present invention provides for a method for providing enhanced system interoperability by improved interfacing of application programs with device drivers. One advantage is that the method is computationally more efficient than previously known techniques. Another advantage provided by this approach is that reliance upon large cumbersome general purpose APIs can be reduced.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for interfacing an application program to provide access to functions comprising a device driver (device driver functions), said method comprising:

assigning a unique identifier to each of said device driver functions;

providing an application wrapper program for said application program, said application wrapper program having at least one surrogate function for said application program to invoke, said surrogate function corresponding to one of said device driver functions;

providing a device driver wrapper program for said device driver;

extracting at least one parameter passed from said application program responsive to an invocation of one of said device driver functions by said application program through said surrogate function;

storing said at least one parameter in a data packet along with a unique corresponding message number;

sending said data packet to said device driver wrapper program;

determining in said device driver wrapper program a selected device driver function being invoked by said application program using said unique corresponding message number;

retrieving said at least one parameter from said data packet; and invoking said selected device driver function.

2. The method of claim 1 further comprising returning output data from said selected device driver function through said device driver wrapper program and said application wrapper program.

3. The method of claim 1 wherein said storing comprises packing said at least one parameter in a data packet along with a unique corresponding message number.

4. The method of claim 1 wherein said retrieving comprises unpacking said at least one parameter in a data packet along with a unique corresponding message number.

5. A computer program product for interfacing an application program to provide access to functions comprising a device driver (device driver functions), said computer program product comprising:

code for assigning a unique identifier to each of said device driver functions;

code for providing an application wrapper program for said application program, said application wrapper program having at least one surrogate function for said application program to invoke, said surrogate function corresponding to one of said device driver functions;

code for providing a device driver wrapper program for said device driver;

code for extracting at least one parameter passed from said application program responsive to an invocation of one of said device driver functions by said application program through said surrogate function;

code for storing said at least one parameter in a data packet along with unique corresponding message number;

code for sending said data packet to said device driver wrapper program;

code for determining in said device driver wrapper program a selected device driver function being invoked by said application program using said unique corresponding message number;

code for retrieving said at least one parameter from said data packet;

code for invoking said selected device driver function; and a computer readable storage medium for holding said codes.

6. The computer program product of claim 5 comprising code for returning output data from said selected device driver function through said device driver wrapper program and said application wrapper program.

7. The computer program product of claim 5 wherein said code for storing comprises code for packing said at least one parameter in a data packet along with a unique corresponding message number.

8. The computer program product of claim 5 wherein said code for retrieving comprises code for unpacking said at least one parameter in a data packet along with a unique corresponding message number.

9. An apparatus for interfacing an application program to access functions comprising a device driver (device driver functions), said apparatus comprising:

a memory;

a system bus;

a processor, interconnected by said system bus to said memory, said processor operatively disposed to:

assign a unique identifier to each of said device driver functions;

provide an application wrapper program for said application program, said application wrapper program having at least one surrogate function for said application program to invoke, said surrogate function corresponding to one of said device driver functions;

provide a device driver wrapper program for said device driver;

extract at least one parameter passed from said application program responsive to an invocation of one of said device driver functions by said application program through said surrogate function;

store said at least one parameter in a data packet along with a unique corresponding message number;

send said data packet to said device driver wrapper program;

determine in said device driver wrapper program a selected device driver function being invoked by said application program using said unique corresponding message number;

retrieve said at least one parameter from said data packet; and invoke said selected device driver function.

10. The apparatus of claim 9 wherein said processor is operatively disposed to return output data from said selected device driver function through said device driver wrapper program and said application wrapper program.

11. The apparatus of claim 9 wherein said at least one parameter is packed in a data packet along with a unique corresponding message number.

12. The apparatus of claim 9 wherein said at least one parameter is unpacked in a data packet along with a unique corresponding message number.

* * * * *